United States Patent
Anjo

(10) Patent No.: US 10,929,791 B2
(45) Date of Patent: Feb. 23, 2021

(54) TASK MANAGEMENT APPARATUS, TASK MANAGEMENT METHOD AND COMPUTER-READABLE MEDIUM

(71) Applicant: CASIO COMPUTER CO., LTD., Tokyo (JP)

(72) Inventor: Keita Anjo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1015 days.

(21) Appl. No.: 15/460,694

(22) Filed: Mar. 16, 2017

(65) Prior Publication Data
US 2017/0278042 A1    Sep. 28, 2017

(30) Foreign Application Priority Data

Mar. 23, 2016 (JP) .............................. JP2016-057946
Dec. 19, 2016 (JP) .............................. JP2016-245092

(51) Int. Cl.
*G06Q 10/06* (2012.01)
*G06F 3/0481* (2013.01)
(Continued)

(52) U.S. Cl.
CPC ... *G06Q 10/063114* (2013.01); *G06F 3/0482* (2013.01); *G06F 3/04817* (2013.01); *G06F 3/04883* (2013.01)

(58) Field of Classification Search
CPC ...... G06Q 10/063114; G06Q 10/06311; G06F 3/04817; G06F 3/0482; G06F 3/04883
(Continued)

(56) References Cited

U.S. PATENT DOCUMENTS

2003/0020951 A1* 1/2003 Minowa ................. G06Q 30/02
358/1.15
2003/0078798 A1* 4/2003 Zaks ................ G06Q 10/06375
705/7.37
(Continued)

FOREIGN PATENT DOCUMENTS

JP          06012378 A    1/1994
JP       2007025737 A    2/2007
(Continued)

OTHER PUBLICATIONS

Japanese Office Action dated Oct. 29, 2019 (and English translation thereof) issued in Japanese Patent Application No. 2016-245092.

*Primary Examiner* — Eric W Stamber
*Assistant Examiner* — George H Walker, III
(74) *Attorney, Agent, or Firm* — Holtz, Holtz & Volek PC

(57) ABSTRACT

A task management apparatus includes a display controller and a retriever. The display controller displays a check sheet for checking whether a task on a certain date and time has been completed with respect to each predetermined date and time. The check sheet is displayed individually with respect to each type of the task. The retriever retrieves a completion notification that indicates completion of the task. The completion notification includes date and time information on a date and a time of the completion of the task. The check sheet includes a mark pasting area for pasting a predetermined mark with respect to each predetermined date and time. When the retriever retrieves the completion notification, the display controller changes a display manner of the mark pasting area of a date and time corresponding to the completion notification.

17 Claims, 14 Drawing Sheets

(51) Int. Cl.
*G06F 3/0482* (2013.01)
*G06F 3/0488* (2013.01)

(58) Field of Classification Search
USPC .......................................................... 705/715
See application file for complete search history.

(56) References Cited

U.S. PATENT DOCUMENTS

| | | | |
|---|---|---|---|
| 2014/0278648 A1* | 9/2014 | Bussey | G06Q 10/063114 705/7.15 |
| 2014/0297348 A1* | 10/2014 | Ellis | G06Q 10/063114 705/7.15 |
| 2014/0337071 A1* | 11/2014 | Stiffler | G06Q 10/06311 705/7.13 |
| 2015/0112704 A1* | 4/2015 | Braun | G06Q 10/20 705/2 |
| 2015/0127403 A1* | 5/2015 | Petty | G06F 3/04842 705/7.18 |

FOREIGN PATENT DOCUMENTS

| | | |
|---|---|---|
| JP | 2008197257 A | 8/2008 |
| JP | 2008292159 A | 12/2008 |

\* cited by examiner

FIG.4

| TASK NO. | TITLE OF SHEET | REGISTRANT | REGISTRATION DATE AND TIME | RELATED DUTY | FREQUENCY | COMPLETION DATE | PERSON WHO PERFORMED | NOTE |
|---|---|---|---|---|---|---|---|---|
| 1 | CLEAN TOILET | T. TANAKA | DEC. 18, 2014, 16:35 | ALL | EVERYDAY | DEC. 29, 2014 DEC. 30, 2015 ... | T. TANAKA J. YAMADA ... | CLEANING BEFORE OPENING |
| 2 | RACK D INVENTORY | J. YAMADA | FEB. 5, 2015, 17:35 | WAITING | EVERY OTHER MON. | FEB. 8, 2015 ... | S. SUZUKI ... | BEVERAGE INVENTORY |
| 3 | PREPARE GREEN ONION | J. YAMADA | FEB. 5, 2015, 18:35 | COOKING | MON., WED., SAT. | FEB. 8, 2015 ... | S. KATO ... | PREPARE GREEN ONION |
| ... | | | | | | | | ... |

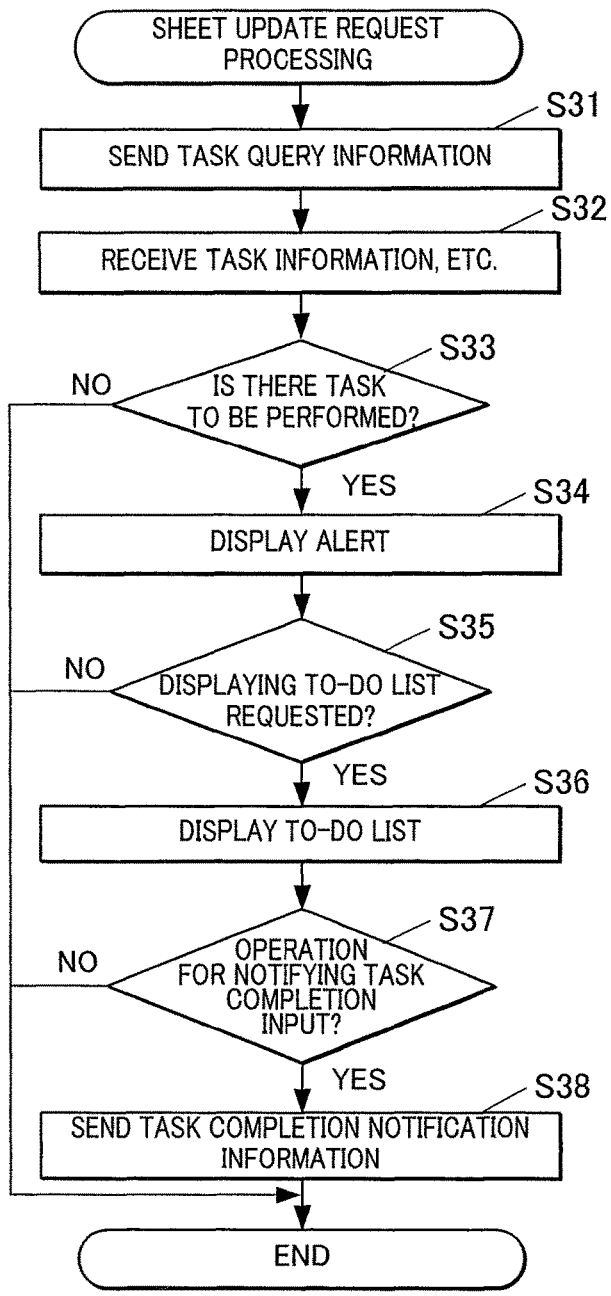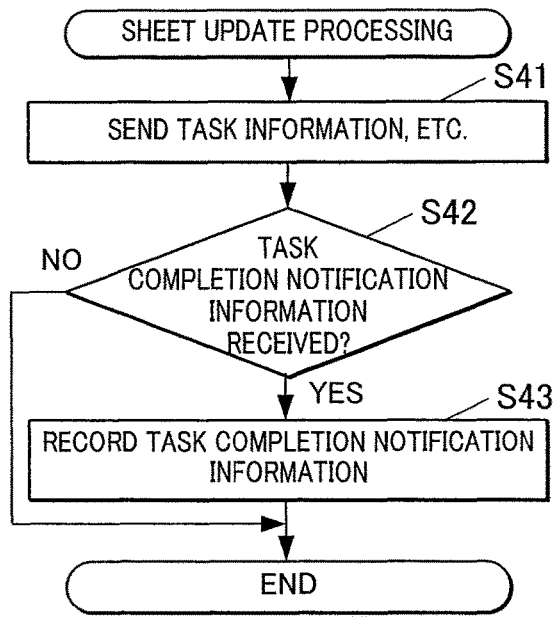

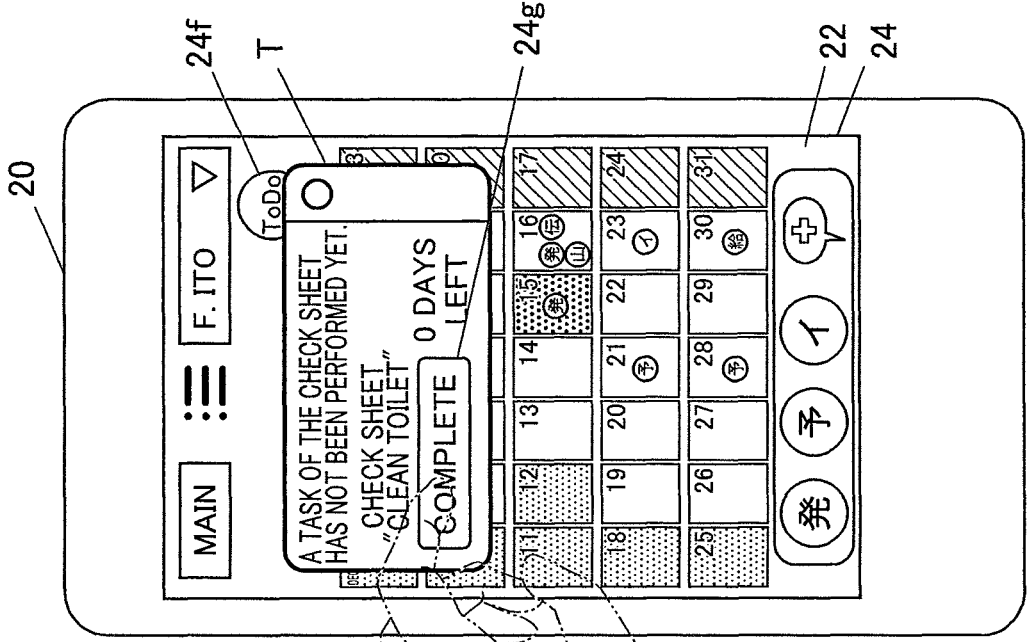
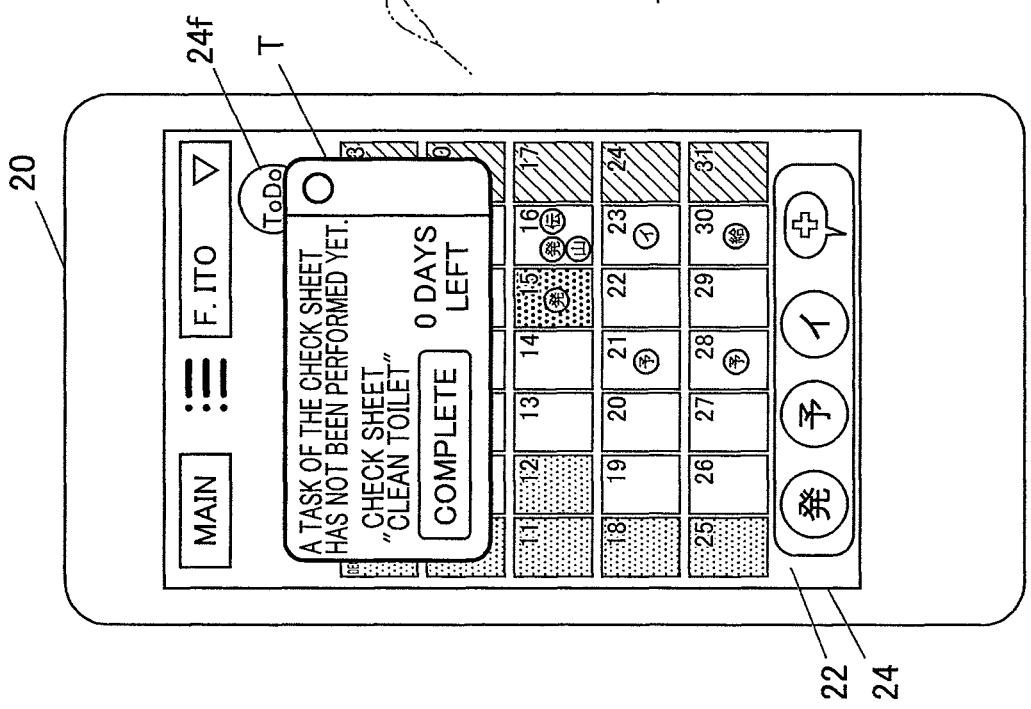

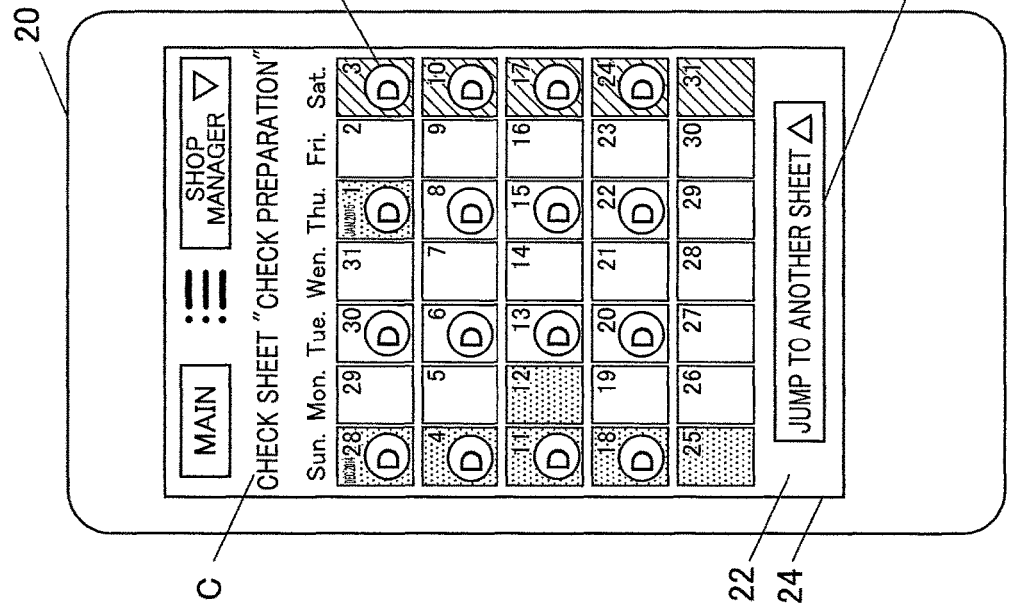
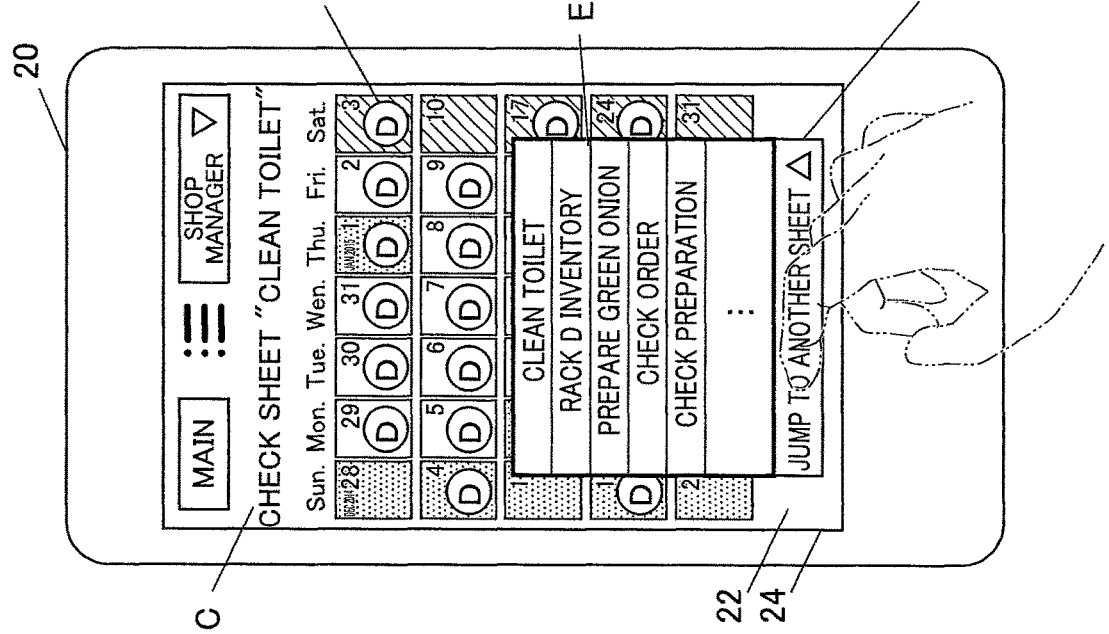

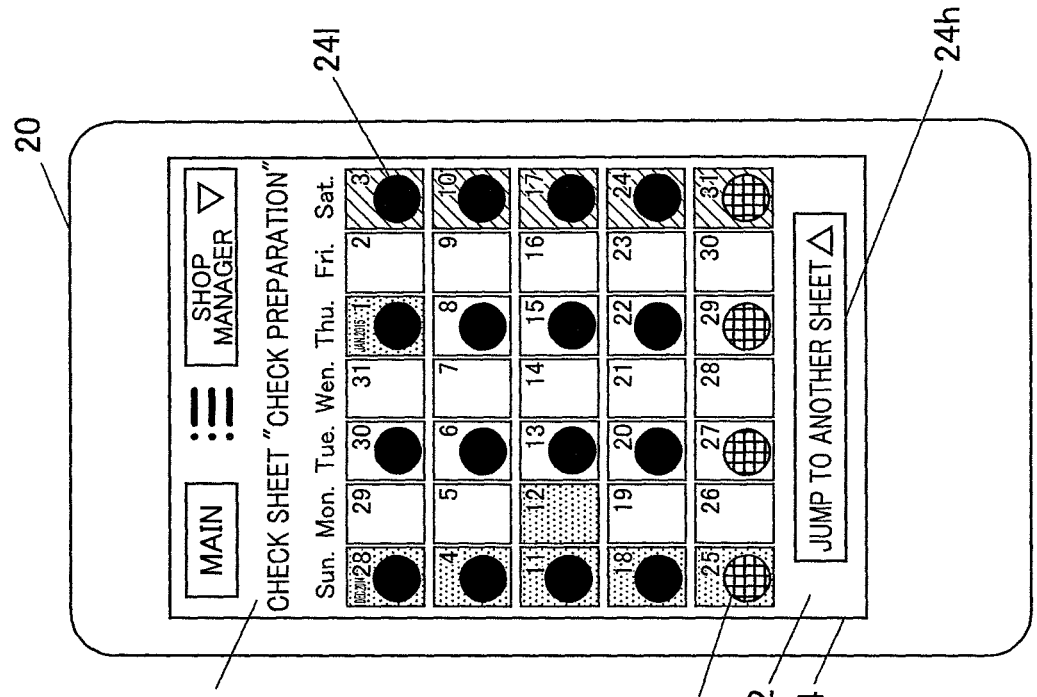
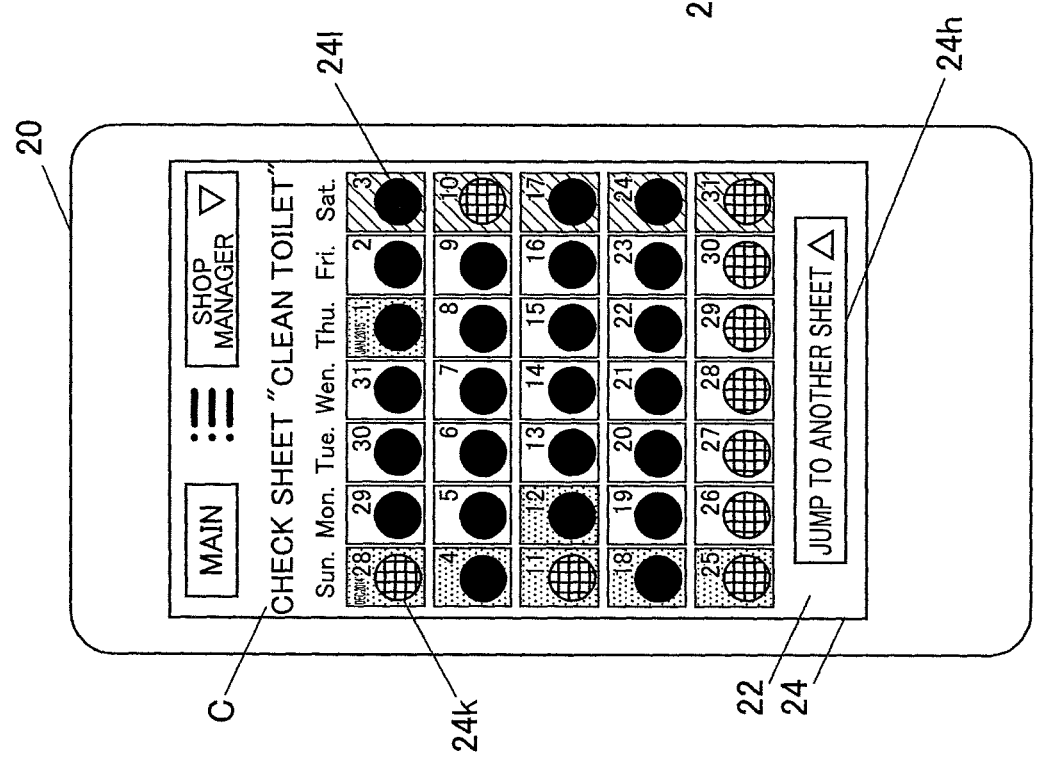

TASK MANAGEMENT APPARATUS, TASK MANAGEMENT METHOD AND COMPUTER-READABLE MEDIUM

CROSS-REFERENCE TO RELATED APPLICATIONS

This application is based upon and claims the benefit of priority from the prior Japanese Patent Application No. 2016-057946, filed on Mar. 23, 2016 and the prior Japanese Patent Application No. 2016-245092, filed on Dec. 19, 2016, the entire contents of which are incorporated herein by reference.

BACKGROUND OF THE INVENTION

1. Field of the Invention

The present invention relates to a task management apparatus, a task management method and a computer-readable medium.

2. Description of the Related Art

A schedule management apparatus has been known in the art, which can show, for example, non-completion, completion or cancellation of a scheduled task as a mark (including a blank) in a column of scheduled tasks (see JP 2007-25737A).

SUMMARY OF THE INVENTION

However, a problem with the above-described schedule management apparatus is that when there are various types of scheduled tasks, it becomes difficult to check the scheduled tasks since the marks of the respective scheduled tasks are shown together in the column.

The present invention has been made in view of the above-described problem, and an object thereof is to make it easier to check whether a task to be performed has been completed.

In order to realize the above object, according to a first aspect of the present invention, there is provided a task management apparatus, including:

a display controller which displays a check sheet for checking whether a task on a certain date and time or in a certain time period has been completed with respect to each predetermined date and time or each predetermined time period, in which the check sheet is displayed individually with respect to each type of the task; and a retriever which retrieves a completion notification that indicates completion of the task, wherein the completion notification includes date and time information or time information on a date and a time of the completion of the task of the completion notification, wherein the check sheet includes a mark pasting area for pasting a predetermined mark with respect to each predetermined date and time or each predetermined time period, and wherein when the retriever retrieves the completion notification, the display controller changes a display manner of the mark pasting area of a date and time or a time period corresponding to the completion notification and displays the check sheet.

According to a second aspect of the present invention, there is provided a task management method, including:

a display controlling step of displaying a check sheet for checking whether a task on a certain date and time or in a certain time period has been completed with respect to each predetermined date and time or each predetermined time period, in which the check sheet is displayed individually with respect to each type of the task; and a retrieving step of retrieving a completion notification that indicates completion of the task, wherein the completion notification includes date and time information or time information on a date and a time of the completion of the task of the completion notification, wherein the check sheet comprises a mark pasting area for pasting a predetermined mark with respect to each predetermined date and time or each predetermined time period, and wherein in the display controlling step, when the completion notification is retrieved in the retrieving step, a display manner of the mark pasting area of a date and time or a time period corresponding to the completion notification is changed and the check sheet is displayed.

According to a third aspect of the present invention, there is provided a non-transitory computer-readable medium storing a program for making a computer of a task management apparatus perform the following processing of:

a display control processing of displaying a check sheet for checking whether a task on a certain date and time or in a certain time period has been completed with respect to each predetermined date and time or each predetermined time period, in which the check sheet is displayed individually with respect to each type of the task; and a retrieval processing of retrieving a completion notification that indicates completion of the task, wherein the completion notification includes date and time information or time information on a date and a time of the completion of the task of the completion notification, wherein the check sheet comprises a mark pasting area for pasting a predetermined mark with respect to each predetermined date and time or each predetermined time period, and wherein in the display control processing, when the completion notification is retrieved in the retrieval processing, a display manner of the mark pasting area of a date and time or a time period corresponding to the completion notification is changed and the check sheet is displayed.

With the present invention, it is possible to make it easier to check whether a task to be performed has been completed.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 4 illustrates the structure of a task DB;

FIG. 8A is a flowchart of sheet update request processing, and FIG. 8B is a flowchart of sheet update processing;

FIG. 10A and FIG. 10B illustrate an example of a display screen of the terminal when the sheet update request processing is performed;

FIG. 13A and FIG. 13B illustrate an example of a display screen of the terminal when the sheet check request processing is performed.

FIG. 16A and FIG. 16B illustrate another example of the display manner of a mark that is pasted on a check sheet.

DETAILED DESCRIPTION OF THE PREFERRED EMBODIMENTS

Hereinafter, an embodiment of the present invention will be described in detail referring to the appended drawings. However, the present invention is not limited to the illustrated examples.

Figure 1:
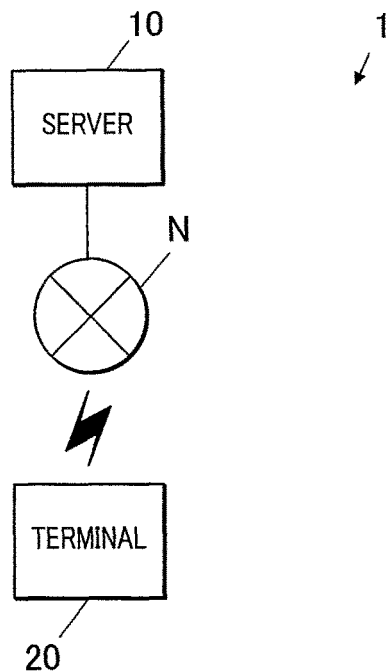
FIG. 1 is a block diagram of a task management system according to an embodiment of the present invention.

The device configuration of a system according to the embodiment will be described referring to FIG. 1 to FIG. 3. The task management system 1 of the embodiment will be described referring to FIG. 1. FIG. 1 is a block diagram of the task management system 1 of the embodiment.

The task management system 1 includes a server 10 as a task management apparatus, and a terminal 20. The server 10, which is a cloud server, manages information on a task that is a work item to be performed by a user of the terminal 20. The server 10 is connected to a communication network N. The communication network N is the Internet in the embodiment. However, it may be other networks such as a LAN (local area network) or the like.

The terminal 20 is owned and used by a manager or staff as a user. For example, the terminal 20 is constituted by a portable terminal such as a tablet PC, a notebook PC, a smartphone or the like, which is wirelessly connectable to the communication network N. Accordingly, the terminal 20 can be used anytime anywhere.

The communication network N is the Internet in the embodiment. However, it may also include other networks such as a WAN (wide area network), a LAN (local area network), a dedicated line and the like.

Although FIG. 1 depicts only one terminal 20 of the task management system 1, the task management system 1 includes a plurality of terminals 20 that are respectively owned by a manager and staff, and the server 10 manages information on tasks of the staff. In each of the terminals 20, an application (hereinafter referred to as a task management app) that realizes a function of managing the information on tasks is installed.

The functional configuration of the server 10 will be described referring to FIG. 2. FIG. 2 is a block diagram of the functional configuration of the server 10.

Figure 2:
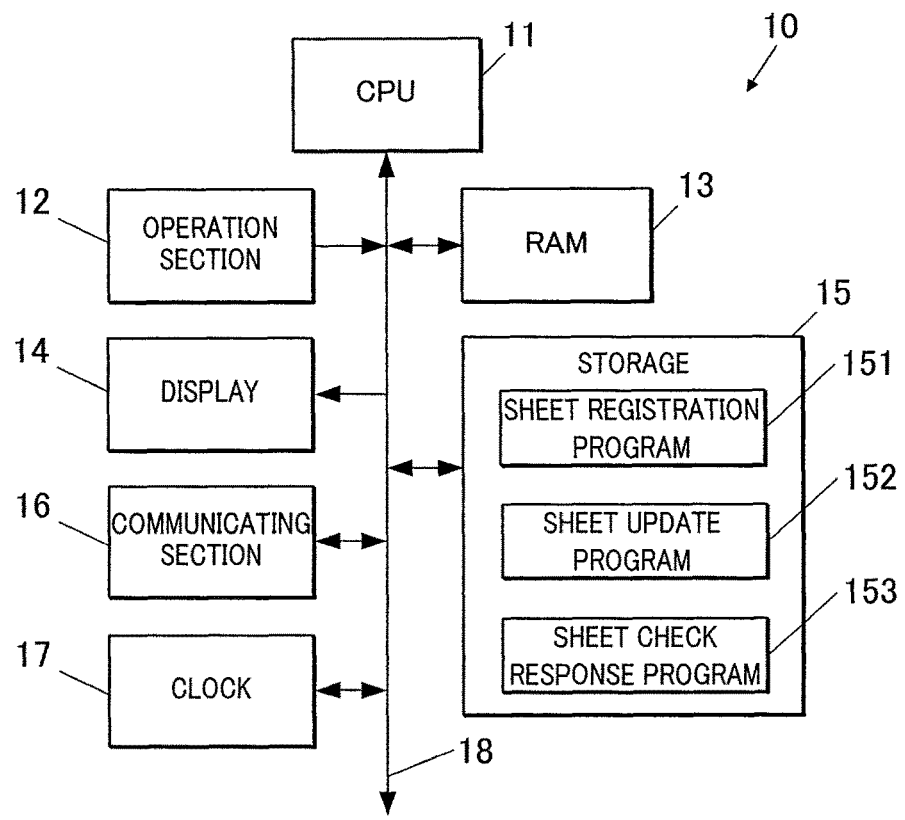
FIG. 2 is a block diagram of the functional configuration of a server.
Figure 3:
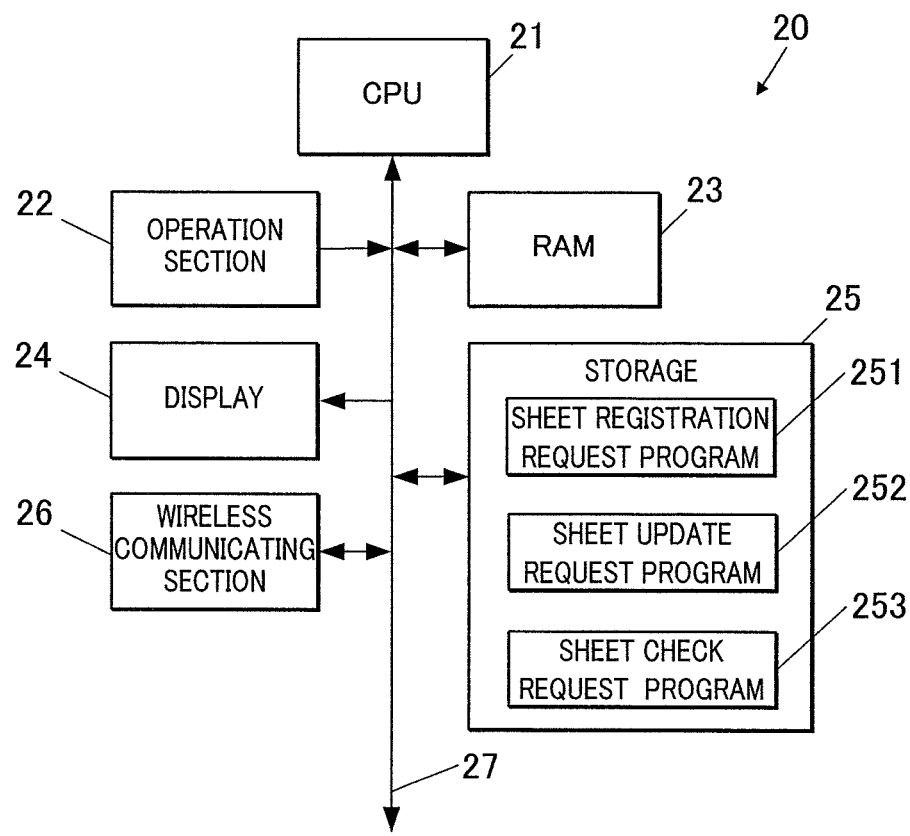
FIG. 3 is a block diagram of the functional configuration of a terminal.

As illustrated in FIG. 2, the server 10 includes a display controller, a CPU (central processing unit) 11 that serves as a retriever, an operation section 12, a RAM (random access memory) 13, a display 14, a storage 15, a communicating section 16 and a clock 17. These components of the server 10 are connected to each other by a bus 18.

The CPU 11 controls the components of the server 10. The CPU 11 reads out a program selected from among a system program and an application program stored in the storage 15, deploys it in the RAM 13 and performs a variety of processing in cooperation with the deployed program.

The operation section 12, which includes a key input section such as a keyboard and a pointing device such as a mouse, receives a key input and a positional input and outputs the operation information to the CPU 11.

The RAM 13, which is constituted by a volatile memory, serves as a work area in which a variety of data and programs are temporarily stored. The display 14, which is constituted by an LCD (liquid crystal display), an EL (electroluminescence) display or the like, displays a variety of information according to display information from the CPU 11.

The storage 15 is constituted by an HDD (hard disk drive), an SSD (solid state drive) or the like. Data and programs can be read from and written in the storage 15. In particular, the storage 15 stores a sheet registration program 151, a sheet update program 152, a sheet check response program 153, a task DB (database) 30 described below, and a staff account DB 40.

The communicating section 16, which is constituted by a network card or the like, is connected to the communication network N and communicates with devices in the communication network N. Through the communicating section 16, the CPU 11 can communicate with the terminals 20 in the communication network N.

The functional configuration of one of the terminals 20 will be described referring to FIG. 3. FIG. 3 is a block diagram of the functional configuration of the terminal 20.

The terminal 20 includes a CPU 21, an operation section 22, a RAM 23, a display 24, a storage 25 and a wireless communicating section 26. These components of the terminal 20 are connected to each other by a bus 27.

Since the CPU 21, the RAM 23 and the display 24 are similar respectively to the CPU 11, the RAM 13 and the display 14 of the server 10, the repetitive description is omitted, and the different configuration will be mainly described.

The CPU 21 controls the components of the terminal 20. The operation section 22, which includes a touch panel disposed on the display screen of the display 24, receives a user touch input and outputs the operation information to the CPU 21.

The storage 25 is constituted by a flash memory, an EEPROM (electrically erasable programmable ROM) or the like. Data and programs can be read from and written in the storage 25. In particular, a sheet registration request program 251, a sheet update request program 252 and a sheet check request program 253 are stored in the storage 25.

The wireless communicating section 26, which is constituted by an antenna, a modulator/demodulator, a signal processing circuit and the like, wirelessly sends and receives information to and from a base station, an access point or the like in the communication network N by means of radio wave. By using the wireless communicating section 26, the CPU 21 can communicate with the server 10 via a base station, an access point or the like in the communication network N.

Figure 5:
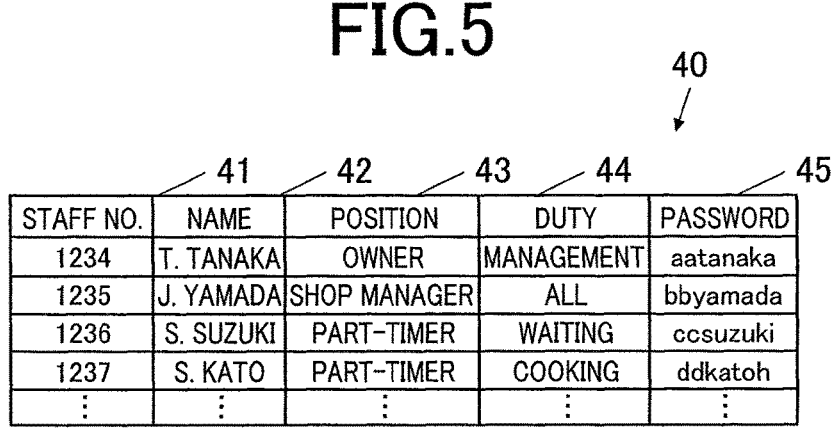
FIG. 5 illustrates the structure of a staff account DB.

The task DB 30 and the staff account DB 40 that are stored in the storage 15 of the server 10 will be described referring to FIG. 4 and FIG. 5. FIG. 4 illustrates the structure of the task DB 30. FIG. 5 illustrates the structure of the staff account DB 40.

As illustrated in FIG. 4, the task DB 30 includes the items of "task No." 31, "title of sheet" 32, "registrant" 33, "registration date and time" 34, "related duty" 35, "frequency" 36, "completion date" 37, "person who performed" 38 and "note" 39.

Figure 7A:
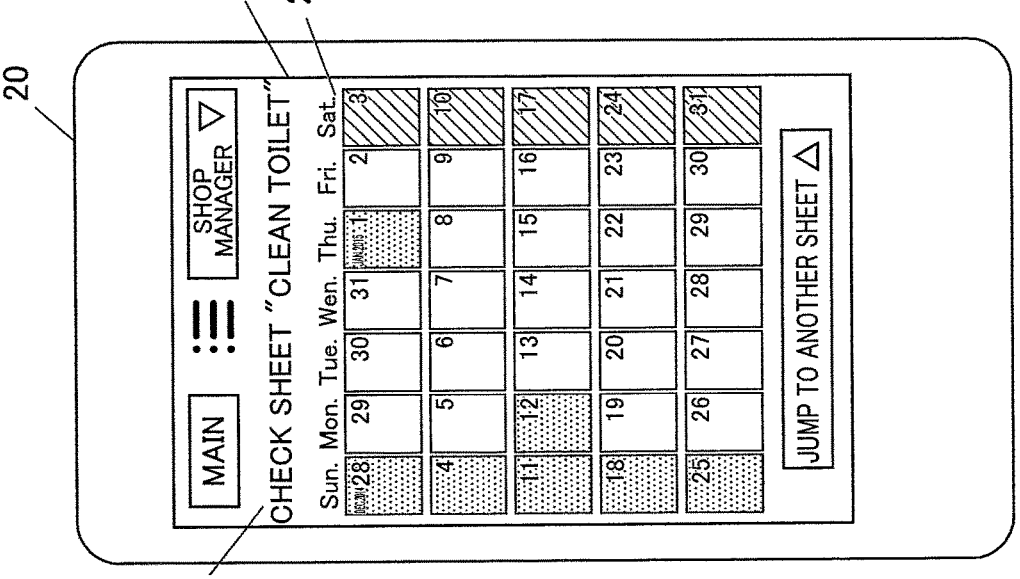
FIG. 7A and FIG. 7B illustrate an example of a display screen of the terminal when the sheet registration request processing is performed.
Figure 7B:
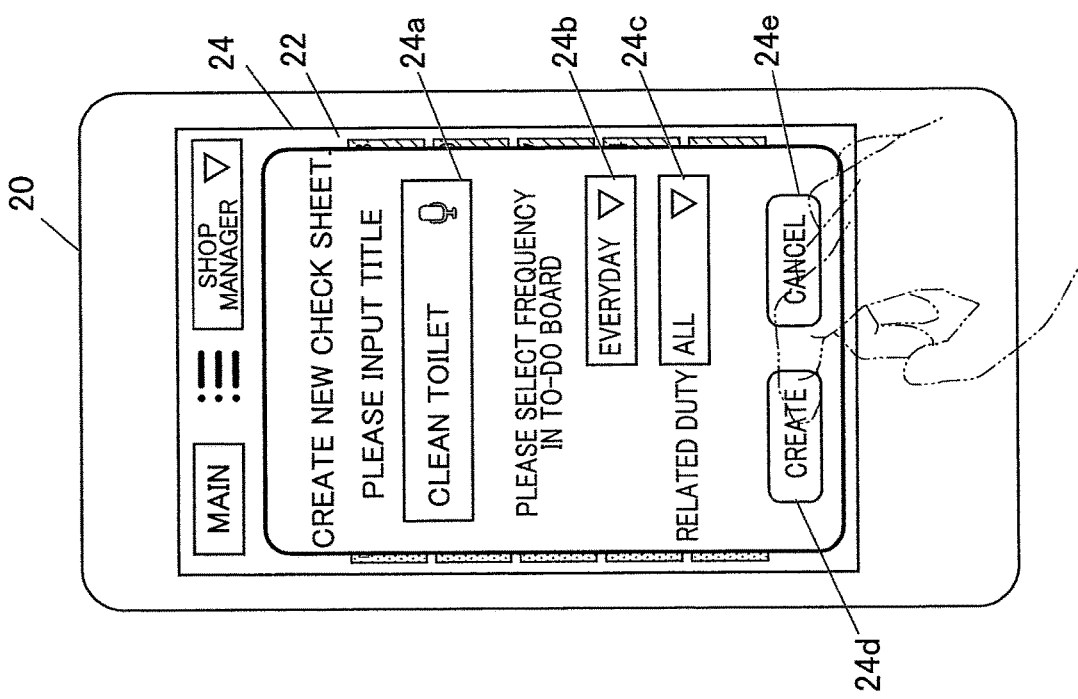

The item "task No." 31 is an identification number for identifying a registered check sheet C. As used herein, the check sheet C refers to a check sheet that is used for checking whether a task to be performed has been completed. The check sheet C is mainly used for a task that is performed on a regular basis. Accordingly, the check sheet C is in a form of a monthly calendar list as illustrated in FIG. 7B, which includes a date (time slot) when the task (cleaning a toilet) is to be performed so that the user can readily and immediately understand whether the task to be performed has been completed on a regular basis. In the case of a bar or restaurant for example, such a task to be performed on a regular basis is likely to include cleaning a toilet, cleaning a backyard, depositing money into a bank account, checking preparation, checking an order, locking up the bar or restaurant and the like.

The item "title of sheet" 32 is the title of a registered check sheet C. The item "registrant" 33 is the name of a person who requested registration of a check sheet C. The item "registration date and time" 34 is the date and time when a check sheet C is registered. The item "related duty" 35 is an item for specifying a person who performs a task. For example, in the check sheet C titled "clean toilet" (Task No. 1), the item "related duty" 35 is set to "all". Accordingly, the task of cleaning a toilet is sent from the server 10 to the terminals 20 respectively owned by a manager (owner, shop manager, etc.) and all staff.

Figure 12A:
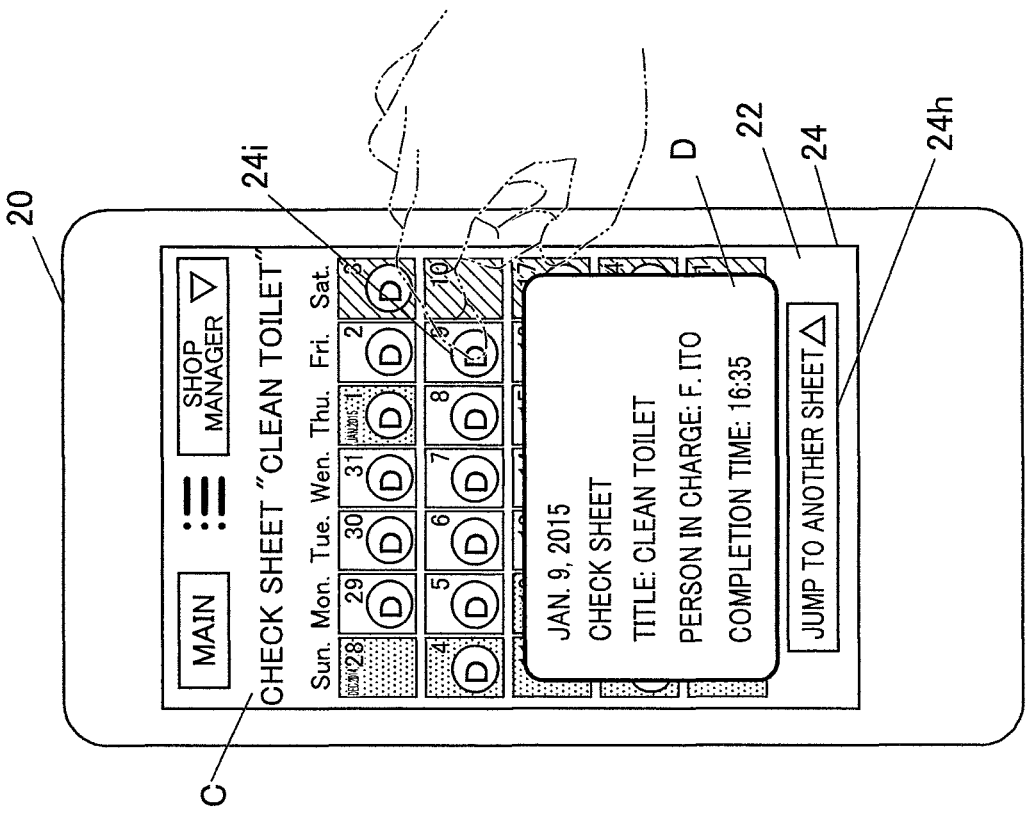
FIG. 12A and FIG. 12B illustrate an example of a display screen of the terminal when the sheet check request processing is performed.

The item "frequency" 36 is frequency of performing the task of a check sheet C. The item "completion date" is the date when the task of a check sheet C is performed. The item "person who performed" 38 is the name of a person who performed the task of a check sheet C. Information on the items "completion date" 37 and "person who performed" 38 is based on task completion notification information (described later) and is recorded in the task DB 30 when the server 10 receives the information. Then, when information on the completion date is recorded in the item "completion date" 37, for example, the check sheet C is updated such that a "done" mark 24i is pasted on the date when the task of the check sheet C is performed as illustrated in FIG. 12A. The item "note" 39 is a note attached to a task, which is displayed on the display 24 of the terminal 20.

As illustrated in FIG. 5, the staff account DB 40 includes the items of "staff No." 41, "name" 42, "position" 43, "duty" 44 and "password" 45.

The item "staff No." 41 is an identification number for identifying a staff member. The item "name" 42 is the name of a staff member. The item "position" 43 is the position of the staff member. The item "duty" 44 is the duty (scope of work) of a staff member. The item "password" 45 is a password for logging in the task management app.

Figure 6A:
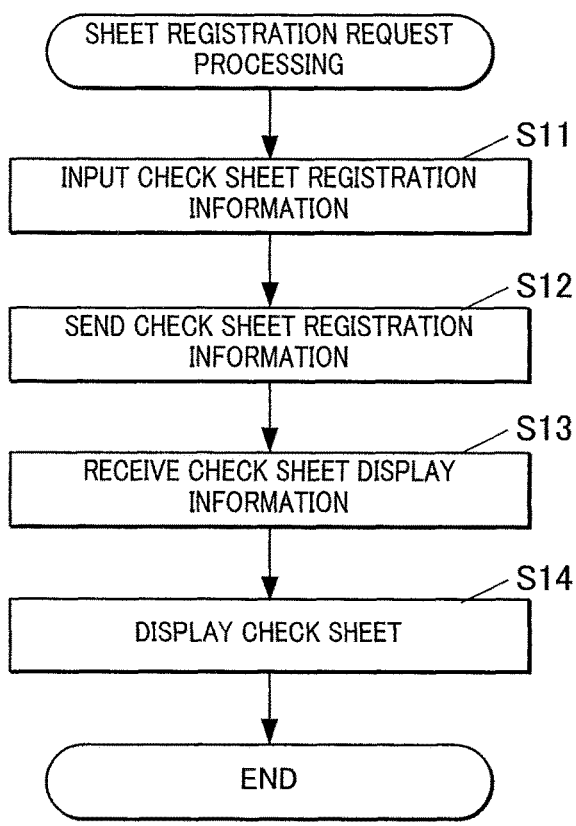
FIG. 6A is a flowchart of sheet registration request processing.
Figure 6B:
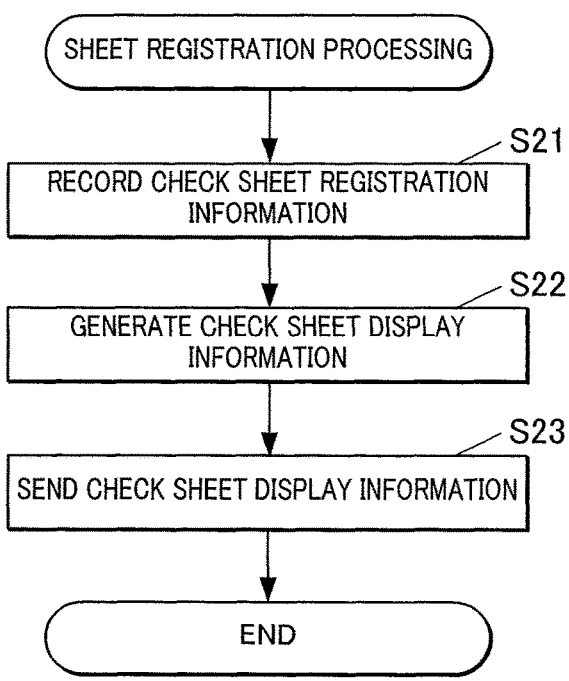
FIG. 6B is a flowchart of sheet registration processing.
Figure 9:
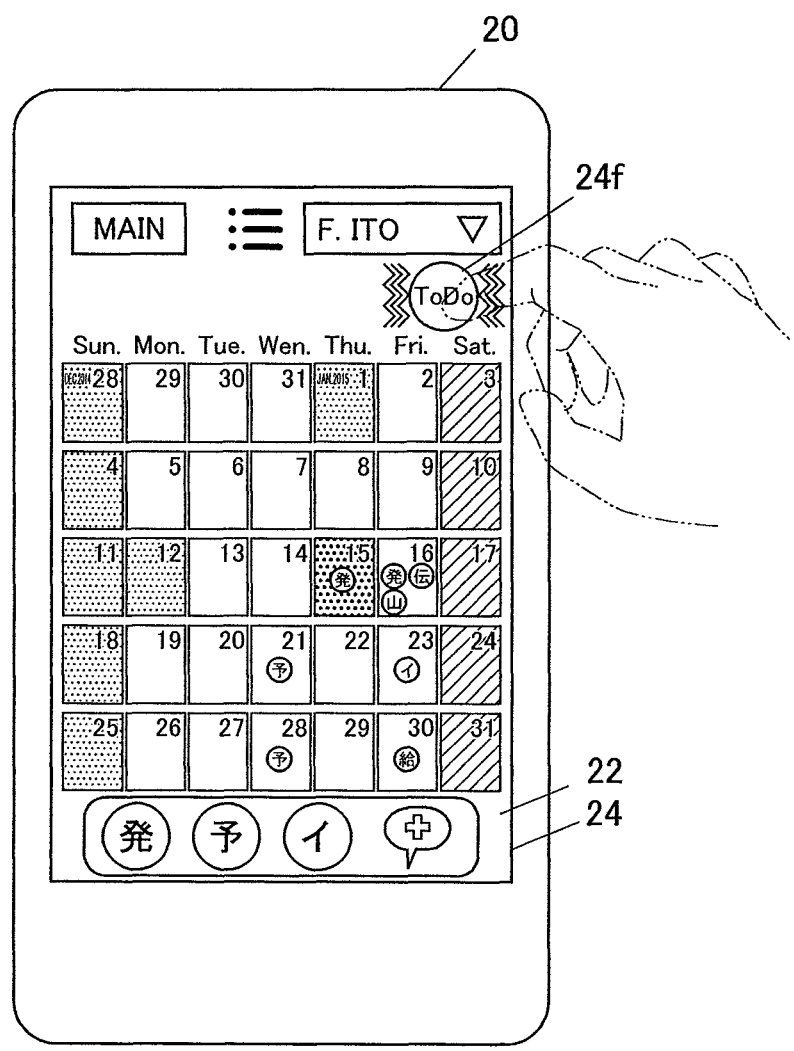
FIG. 9 illustrates an example of a display screen of the terminal when the sheet update request processing is performed.
Figure 11A:
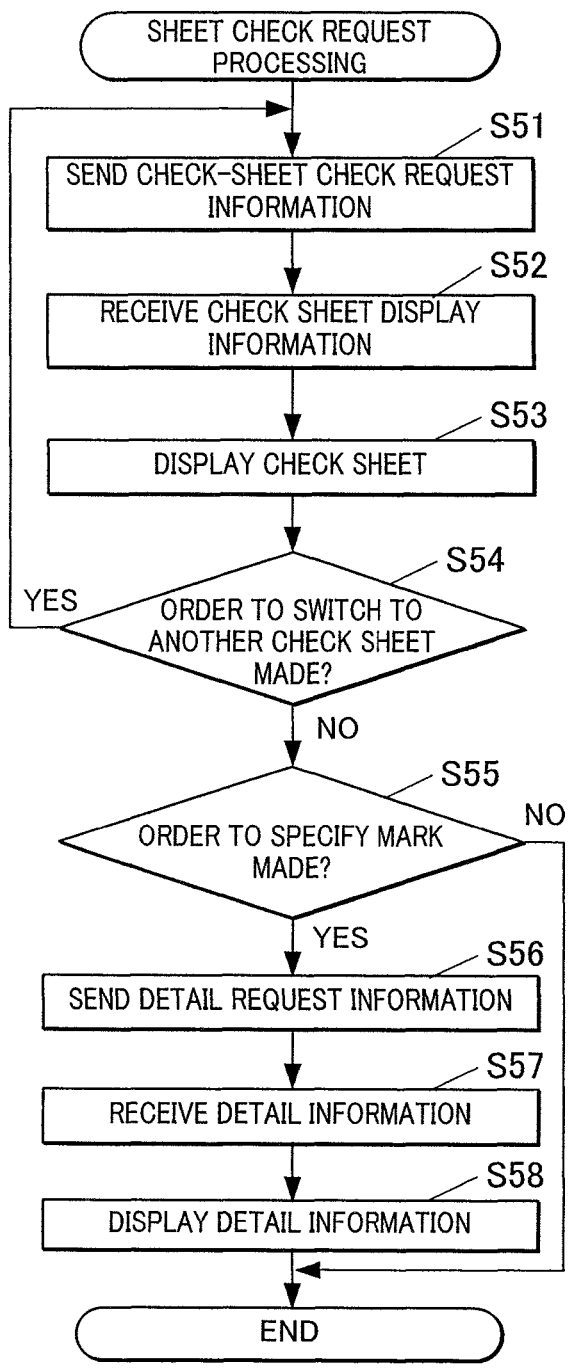
FIG. 11A is a flowchart of sheet check request processing.
Figure 11B:
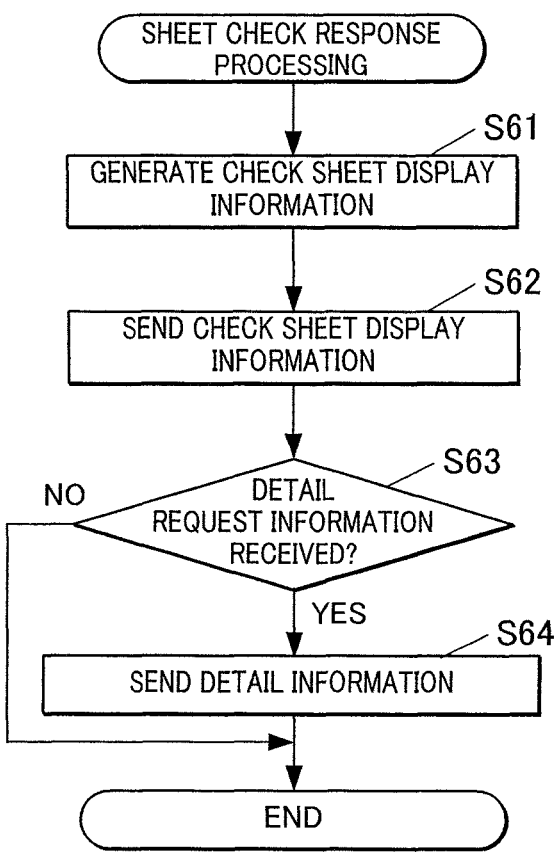
FIG. 11B is a flowchart of sheet check response processing.

The operation of the task management system 1 will be described referring to FIG. 6A to FIG. 12B. FIG. 6A is a flowchart of sheet registration request processing. FIG. 6B is a flowchart of sheet registration processing. FIG. 7A and FIG. 7B illustrate an example of a display screen of the terminal 20 when the sheet registration request processing is performed. FIG. 8A is a flowchart of sheet update request processing. FIG. 8B is a flowchart of sheet update processing. FIG. 9, FIG. 10A and FIG. 10B illustrate examples of a display screen of the terminal 20 when the sheet update request processing is performed. FIG. 11A is a flowchart of sheet check request processing. FIG. 11B is a flowchart of sheet check response processing. FIG. 12A, FIG. 12B, FIG. 13A and FIG. 13B illustrate examples of a display screen of the terminal 20 when the sheet check request processing is performed.

The sheet registration request processing that is performed in the terminal 20 will be described referring to FIG. 6A. The sheet registration request processing involves recording input check sheet registration information in the server 10 and displaying a check sheet C based on check sheet display information that is generated from the check sheet registration information.

In response to a trigger event of an input of an execution order to perform the sheet registration request processing through the operation section 22, the CPU 21 of the terminal 20 performs the sheet registration request processing in cooperation with the sheet registration request program 251 that is read from the storage 25 and suitably deployed in the RAM 23. Specifically, in response to a trigger event of an input of a selection order to select, for example, an item "create new sheet" in a menu screen displayed on the display 24 through the operation section 22, the CPU 21 performs the sheet registration request processing. At this moment, the user of the terminal 20 is supposed to have already logged in the task management app. In the following description, the user has already logged in the task management app when the sheet update request processing (see FIG. 8A) or the sheet check request processing (see FIG. 11A) is performed in the terminal 20.

First, the CPU 21 receives check sheet registration information that is input through the operation section 22 (Step S11). The input check sheet registration information includes information on the title of a check sheet C, information on frequency of performing a task, information on a duty related to the task, information on a necessary note, information on a staff No. and the like.

The check sheet registration information may further include information on the importance, information on segmented individual tasks of a work task, information on a link to another task and the like.

FIG. 7A illustrates a state in which, a text "clean toilet" is input in a text box 24a displayed on the display 24 through the operation section 22 as the title of a check sheet C to be registered. Similarly, "everyday" is input in the first select box 24b as frequency of displaying the task on a to-do board (list) (frequency of performing the task), and "all" is input in the second select box 24c as the related duty (person who performs the task). Then, an instruction order to create the check sheet C is input through a touch operation on a create button 24d. Through the series of input operations, the information on the title of the check sheet "clean toilet", the information on the frequency of performing the task "everyday" and the information on the duty related to the task "all" are received as the check sheet registration information. As illustrated in FIG. 7A, the terminal 20 is capable of performing speech-recognition in response to a touch operation on a microphone mark displayed on the right end of the text box 24a in order to input the title of the check sheet C.

Further, in the terminal 20, the sheet registration request processing can be terminated through a touch operation on a cancel button 24e.

Then, the CPU 21 sends the check sheet registration information input in Step S11 to the server 10 through the wireless communicating section 26 (Step S12). Then, the CPU 21 receives check sheet display information from the server 10 through the wireless communicating section 26 (Step S13). Then, the CPU 21 displays the check sheet C on the display 24 based on the check sheet display information received in Step S13 (Step S14). Then, the sheet registration request processing ends.

FIG. 7B illustrates the check sheet C titled "clean toilet" displayed on the display 24.

The sheet registration processing that is performed in the server 10 will be described referring to FIG. 6B. The sheet registration processing, which corresponds to the sheet registration request processing in the terminal 20, involves recording the check sheet registration information in the task DB 30, generating the check sheet display information based on the check sheet registration information and sending the generated check sheet display information to the terminal 20.

In response to a trigger event of receiving the check sheet registration information through the communicating section 16, which is sent from the terminal 20 in Step S12 in FIG. 6A, the CPU 11 of the server 10 performs the sheet registration processing in cooperation with the sheet registration program 151 that is read from the storage 15 and suitably deployed in the RAM 13.

First, the CPU 11 records the check sheet registration information sent from the terminal 20 in the task DB 30 (Step S21). In Step S21, the CPU 11 provides a new task No. when recording the check sheet registration information. The task No. is provided in the order of recording the check sheet registration information. Further, the CPU 11 retrieves the name of a staff member from the staff account DB 40 based on the information on the staff No. of the check sheet registration information. Then, The CPU 11 stores the new task No., the retrieved name, the information on the title of the check sheet, the information on the frequency of performing the task, the information on the duty related to the task and the information on the necessary note respectively in the items of "task No." 31, "title of sheet" 32, "registrant" 33, "registration date and time" 34, "related duty" 35, "frequency" 36 and "note" 39 of a new record. In the item "registration date and time" 34, date and time information is stored that is output from the clock 17 to the CPU 11 when the check sheet registration information is recorded in the task DB 30.

Then, the CPU 11 generates check sheet display information for displaying the check sheet C on the display 24 of the terminal 20 based on the newly recorded information in the items of "task No." 31, "title of sheet" 32, "registrant" 33, "registration date and time" 34, "related duty" 35, "frequency" 36 and "note" 39 (Step S22).

Then, the CPU 11 sends the check sheet display information generated in Step S22 to the terminal 20 through the communicating section 16 (Step S23). Then, the sheet registration processing ends.

Next, the sheet update request processing that is performed in the terminal 20 will be described referring to FIG. 8A. The sheet update request processing is to request the server 10 to update the check sheet C of a task to be performed when the task has been performed.

In response to a trigger event of an input of an execution order to perform the sheet update request processing through the operation section 22, the CPU 21 of the terminal 20 performs the sheet update request processing in cooperation with the sheet update request program 252 that is read from the storage 25 and suitably deployed in the RAM 23. Specifically, for example, in response to a trigger event of an input of a selection order to select a business communication mode, in which a to-do list, a list of tasks to be performed, can be displayed on the display 24, on the menu screen through the operation section 22, the CPU 21 performs the sheet update request processing.

First, the CPU 21 sends task query information to the server 10 through the wireless communicating section 26 so as to request task information recorded in the task DB 30 and information on the duty of the staff member (who logged in the task management app and made the selection order to select the business communication mode) recorded in the staff account DB 40 (Step S31). Then, the CPU 21 receives the task information and the information on the duty of the staff member from the server 10 through the wireless communicating section 26 (Step S32). Then, the CPU 21 makes a determination as to whether there is a task to be performed by the staff member based on the task information and the information on the duty of the staff member received in Step S32 (Step S33). Specifically, the CPU 21 makes a determination as to whether there is a task that satisfies the following three conditions: the duty in the information on the duty of the staff member received in Step S32 is included in the related duty in the task information (Condition 1), the date of the selection order to select the business communication mode matches the frequency in the task information (Condition 2), and the date of the selection order to select the business communication mode has not been recorded as the completion date in the task information (Condition 3).

In step S33, if there is no task to be performed, i.e. there is no task that satisfies the above three conditions (Step S33, No), the sheet update request processing ends.

If there is a task to be performed, i.e. there is a task that satisfies the above three conditions (Step S33, Yes), the CPU 21 displays an alert over a screen of the business communication mode on the display 24 so as to make a notification that there is a task to be performed (Step S34). Specifically, as illustrated in FIG. 9, the CPU 21 displays a to-do icon 24f for displaying the to-do list in a pseudo-pulsating manner.

Then, the CPU 21 makes a determination as to whether a display order to display the to-do list is input through the operation section 22 as a touch operation on the to-do icon 24f (Step S35).

In Step S35, if a display order to display the to-do list is not input (Step S35, No), the sheet update request processing ends.

If a display order to display the to-do list is input (Step S35, Yes), the CPU 21 displays the to-do list over the screen of the business communication mode on the display 24 (Step S36). FIG. 10A illustrates the state in which one task T is displayed as the to-do list on the display 24, which indicates that a task of the check sheet "clean toilet" has not performed yet.

Then, the CPU 21 makes a determination as to whether an operation order to notify the server 10 of completion of the task is input through the operation section 22 as a touch operation on a "complete" button 24g as illustrated in FIG. 10B (Step S37).

In Step S37, if an operation order to notify the server 10 of completion of the task is not input (Step S37, No), the sheet update request processing ends.

If an operation order to notify the server 10 of completion of the task is input (Step S37, Yes), the CPU 21 sends task completion notification information to the server 10 through the wireless communicating section 26 (Step S38). Then, the sheet update request processing ends. The task completion notification information includes detailed information on the completion of the task such as information on the staff No. of the staff member who performed the task and the date and time of the completion of the task, i.e. the date and time of the touch operation on the "complete" button 24g.

The sheet update processing that is performed in the server 10 will be described referring to FIG. 8B. The sheet update processing is to update the check sheet registration information in the server 10 corresponding to the sheet update request processing in the terminal 20.

In response to a trigger event of receiving the task query information through the communicating section 16, which is sent from the terminal 20 in Step S31 in FIG. 8A, the CPU 11 of the server 10 performs the sheet update processing in cooperation with the sheet update program 152 that is read from the storage 15 and suitably deployed in the RAM 13.

First, the CPU 11 retrieves the task information from the task DB 30 according to the task query information sent from the terminal 20 and also retrieves the information on the duty of the staff member (who made the selection order to select the business communication mode) from the staff account DB 40. The CPU 11 sends the task information and the information on the duty of the staff member to the terminal 20 through the communicating section 16 (Step S41).

Then, the CPU 11 makes a determination as to whether the task completion notification information is received through the communicating section 16 (Step S42).

In Step S42, if it is determined that the task completion notification information is not received through the communicating section 16 (Step S42, no), the sheet update processing ends.

If it is determined that the task completion notification information is received through the communicating section 16 (Step S42, Yes), the CPU 11 retrieves the name from the staff account DB 40 based on the information on the staff No. of the staff member who performed the task in the task completion notification information. The CPU 11 records the retrieved name and the information on the date and time of the completion of the task respectively in the items "person who performed" 38 and "completion date" 37 of the task DB 30 (Step S43). Then, the sheet update processing ends.

The sheet check request processing that is performed in the terminal 20 will be described referring to FIG. 11A. The sheet check request processing is to make a request to the server 10 in order to display the check sheet C on the display 24.

In response to a trigger event of an input of an execution order to perform the sheet check request processing through the operation section 22, the CPU 21 performs the sheet check request processing in cooperation with the sheet check request program 253 that is read from the storage 25 and suitably deployed in the RAM 23. Specifically, for example, in response to a trigger event of an input of a selection order to select an item "check" in the menu screen through the operation section 22, the CPU 21 performs the sheet check request processing.

First, the CPU 21 sends check-sheet check request information to the server 10 through the wireless communicating section 26 (Step S51). The check-sheet check request information includes the information of the identification number "Task No." 31 in the task DB 30. Specifically, the check-sheet check request information that is sent first includes the information of Task No. 1. That is, in the default setting of the sheet-check request processing, the check sheet C of Task No. 1 "clean toilet" is requested first.

When an operation order to request a switch to another check sheet is input in Step S54 (described below) (Step S54, Yes) and the process then returns to Step S51, the check-sheet check request information to be sent in this case includes the information of the identification number "Task No." 31 that corresponds to the requested check sheet. Specifically, for example, when a switching order to switch to the check sheet "check preparation" is made, the check-sheet check request information includes the information of the identification number "Task No." 31 that corresponds to the check sheet "check preparation".

Figure 12B:
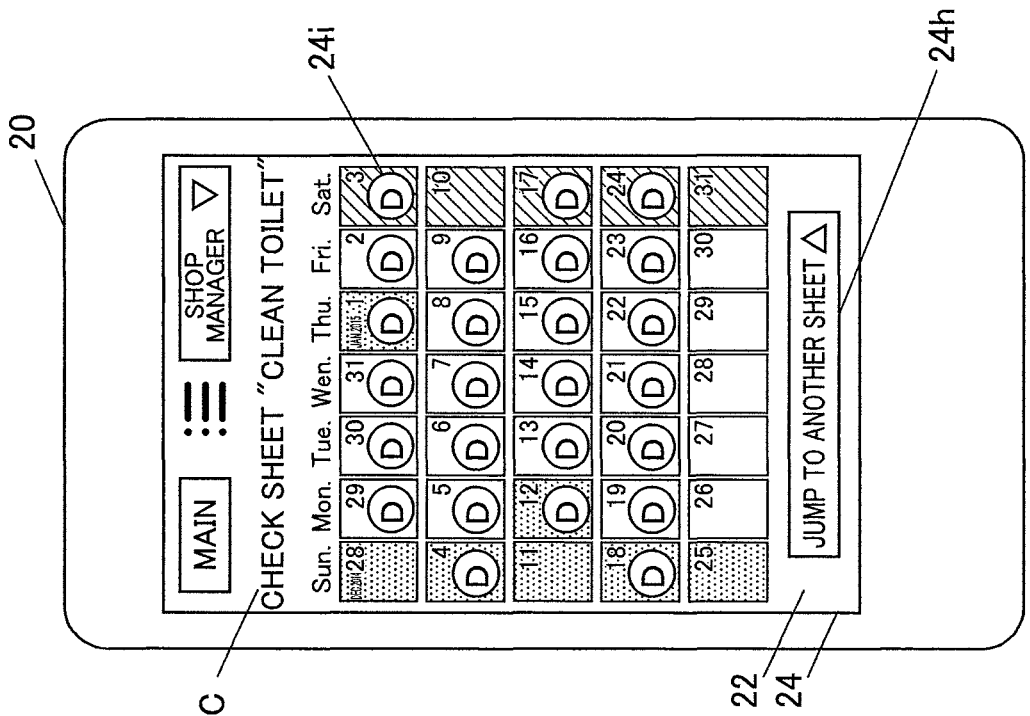

Then, the CPU 21 receives the check sheet display information from the server 10 through the wireless communicating section 26 (Step S52). Then, the CPU 21 displays the check sheet C on the display 24 based on the check sheet display information received in Step S52 (Step S53). FIG. 12A and FIG. 12B illustrate the state in which the check sheet C of Task No. 1 "clean toilet" is displayed on the display 24.

Then, the CPU 21 makes a determination as to whether an operation order to switch to another check sheet is input through the operation section 22 as a touch operation on a "jump to another sheet" button 24h (Step S54).

In Step S54, if an operation order to switch to another check sheet is input (Step S54, Yes), the process returns to Step S51, and the CPU 21 performs the following steps to display another check sheet. Specifically, in the condition in which the check sheet C "clean toilet" is displayed on the display 24 as illustrated in FIG. 13A, when a touch operation on the "jump to another sheet" button 24h is performed, a sub window E for selecting another check sheet C is displayed on the display 24. Then, in the condition in which the sub window E is displayed, when a touch operation on the item "check preparation" is performed for example, the operation is interpreted as an input of an operation order to request a switch to the check sheet C "check preparation", and the check sheet C "check preparation" is therefore displayed on the display 24 according to the input as illustrated in FIG. 13B. In the check sheet C "check preparation", the frequency of checking preparation is set to, for example, Sunday, Tuesday, Thursday and Saturday.

If an operation order to switch to another check sheet is not input (Step S54, No), the CPU 21 makes a determination as to whether an specification order to specify a "done" mark 24i pasted on the check sheet C is input through the operation section 22 as a touch operation on the corresponding "done" mark 24i (Step S55).

In Step S55, if an specification order to specify a "done" mark 24i pasted on the check sheet C is not input (Step S55, No), the sheet check request processing ends.

If an specification order to specify a "done" mark 24i is input (Step S55, Yes), the CPU 21 sends detail request information to the server 10 through the wireless communicating section 26 so as to request detail information related to the date of the "done" mark 24i specified in Step S55 (Step S56).

Then, the CPU 21 receives the detail information related to the date of the "done" mark 24i specified in Step S55 from the server 10 through the wireless communicating section 26 (Step S57). Then, the CPU 21 displays the contents D of the detail information on the display 24 based on the detail information received in Step S57 (Step S58). Then, the sheet check request processing ends. For example, FIG. 12B illustrates the state in which the contents D of the detail information is displayed on the display 24 on the basis that the "done" mark 24*i* pasted on Jan. 9, 2015 has been specified. As the contents D, the name (F. Ito) of the staff member who performed the task (cleaning a toilet) on the specified day and the date and time (Jan. 9, 2015, 16:35) of the completion of the task are displayed.

Next, the sheet check response processing that is performed in the server 10 will be described referring to FIG. 11B. The sheet check response processing, which corresponds to the sheet check request processing in the terminal 20, involves generating check sheet display information and sending it to the terminal 20 according to the check-sheet check request information.

In response to a trigger event of receiving the check-sheet check request information through the communicating section 16, which is sent from the terminal 20 in Step S51 in FIG. 11A, the CPU 11 performs the sheet check response processing in cooperation with the sheet check response program 153 that is read from the storage 15 and suitably deployed in the RAM 13.

First, the CPU 11 generates the check sheet display information (Step S61). Specifically, based on the information of the identification number "Task No." 31 that is included in the check-sheet check request information sent from the terminal 20, the CPU 11 retrieves task information on the corresponding task No. from the task DB 30 and generates the check sheet display information based on the retrieved task information. For example, when the check-sheet check request information received includes the information of Task No. 1, the CPU generates the check sheet display information corresponding to Task No. 1, i.e. the check sheet display information for displaying the check sheet C "clean toilet".

Then, the CPU 11 sends the check sheet display information generated in Step S61 to the terminal 20 through the communicating section 16 (Step S62). Then, the CPU 11 makes a determination as to whether the detail request information is received from the terminal 20 through the communicating section 16 (Step S63).

In step S63, if it is determined that the detail request information is not received through the communicating section 16 (Step S63, No), the sheet check response processing ends.

If it is determined that the detail request information is received through the communicating section (Step S63, Yes), the CPU 11 sends detail information related to the date of the specified "done" mark 24*i* (information on the name of the staff member who performed the task and the information on the date and time of the completion of the task) to the terminal 20 through the communicating section 16 (Step S64). Then, the sheet check response processing ends.

In the above-described embodiment, it can be said that the server 10 displays the check sheet C for checking whether a task to be performed on predetermined times and dates have been completed with respect to each date and time, in which the check sheet C is displayed individually with respect to each type of the task. Further, the server 10 retrieves completion notification that indicates completion of the task. Further, the completion notification includes the date and time information or time information of the completion of the task that corresponds to the completion notification, and the check sheet C includes the mark pasting areas with respect to each date and time on which a predetermined mark is pasted. When the server 10 retrieves the completion notification, it changes the display manner of the mark pasting area of the date and time corresponding to the completion notification and displays the changed check sheet C.

As described above, the check sheet C is displayed individually with respect to each type of the task. Further, the check sheet C is configured such that when a completion notification that indicates completion of a task of the check sheet C is retrieved, the display manner of the mark pasting area of the date and time corresponding to the completion notification is changed. This can make it easier to check whether a task to be performed has been completed.

When the server 10 retrieves the completion notification, it pastes a predetermined mark ("done" mark 24*i*) on the mark pasting area of the date and time corresponding to the completion notification and displays the check sheet C. This enables certainly notifying that a task to be performed has been completed.

The above-described embodiment illustrates an example in which the HDD, SSD or the like of the storage is used as a computer-readable medium storing the program according to the present invention. However, the present invention is not limited thereto. Other applicable computer-readable media include portable recording media such as a flash memory and a CD-ROM. Further, a carrier wave is also applicable as a medium for providing the data of the program according to the present invention through a communication line.

The above-described embodiment is merely an example of the task management apparatus and the program according to the present invention, and the present invention is not limited thereto.

For example, in the above-described embodiment, the terminal 20 performs the sheet registration request processing, the sheet update request processing and the sheet check request processing. However, the present invention is not limited thereto. For example, the server 10 may be configured to perform the processing similar to the sheet registration request processing, the sheet update request processing and the sheet check request processing. That is, the above-described operation of the task management system 1 may be performed in the server 10 alone.

In the above-described embodiment, when the task to be performed is completed, the check sheet C is updated so that the "done" mark 24*i* is pasted. Instead of the "done" mark 24*i*, marks that can identify staff members may be defined beforehand and used. In this case, the user who checks the marks can understand who performed the task to be performed as well as completion of the task.

Figure 14A:
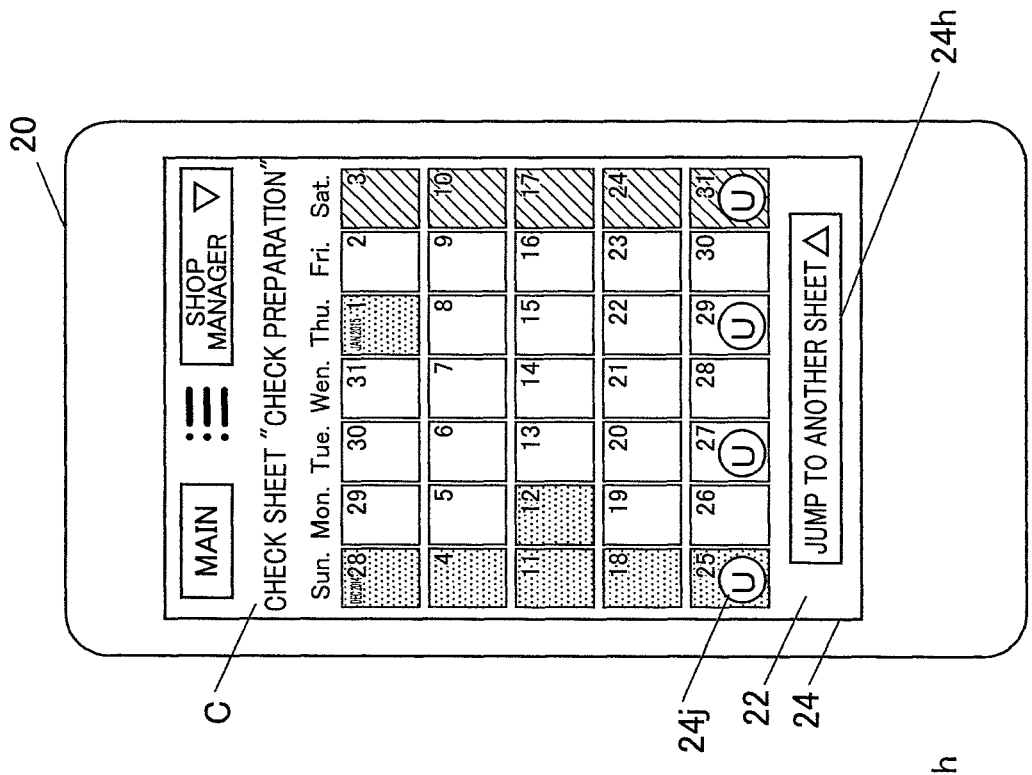
FIG. 14A and FIG. 14B illustrate another example of the display manner of a mark that is pasted on a check sheet.
Figure 14B:
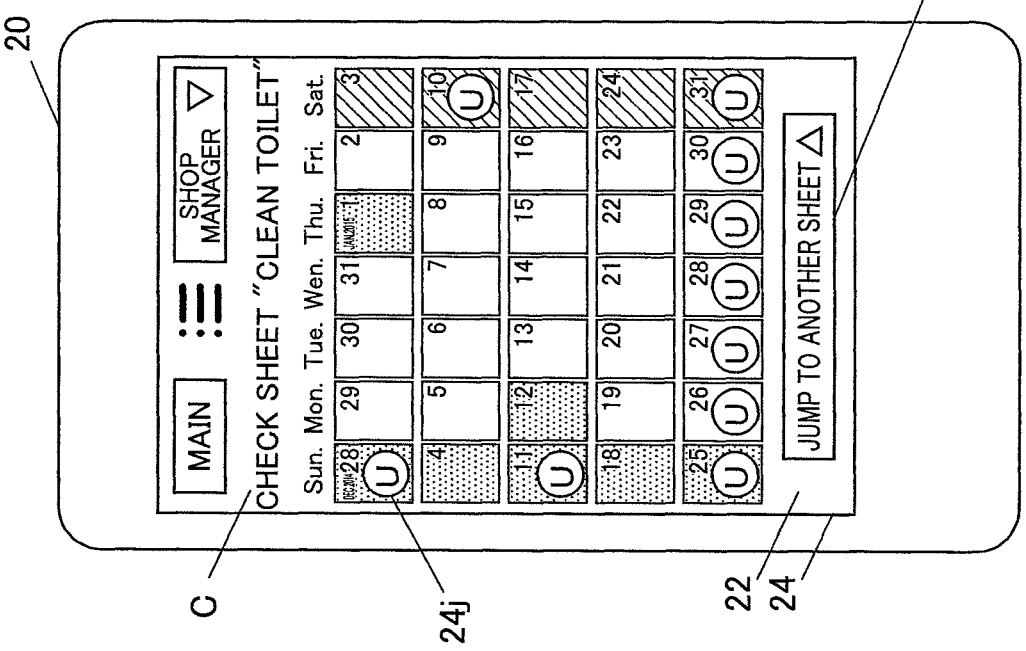

In the above-described embodiment, when a task to be performed is completed, the check sheet C is updated so that the "done" mark 24*i* is pasted. Instead, for example, an "undone" mark 24*j*, which shows a task to be performed has not been performed yet, may be initially pasted on the check sheet C at a location corresponding to the initially specified frequency of performing the task when the check sheet C is created. Specifically, when the frequency of performing the task is "everyday", the "undone" marks 24*j* may be pasted on all of the date frames (mark pasting areas) of the check sheet C. When the task to be performed is completed, the check sheet C may be updated so that the "undone" mark 24*j* of the corresponding date (e.g. Dec. 29 and 30, 2014, and the like) is deleted as illustrated in FIG. 14A and FIG. 14B. FIG. 14A illustrates an example of the check sheet C of "clean toilet" in such configuration, and FIG. 14B illustrates an example of the check sheet C of "check preparation".

Figure 15B:
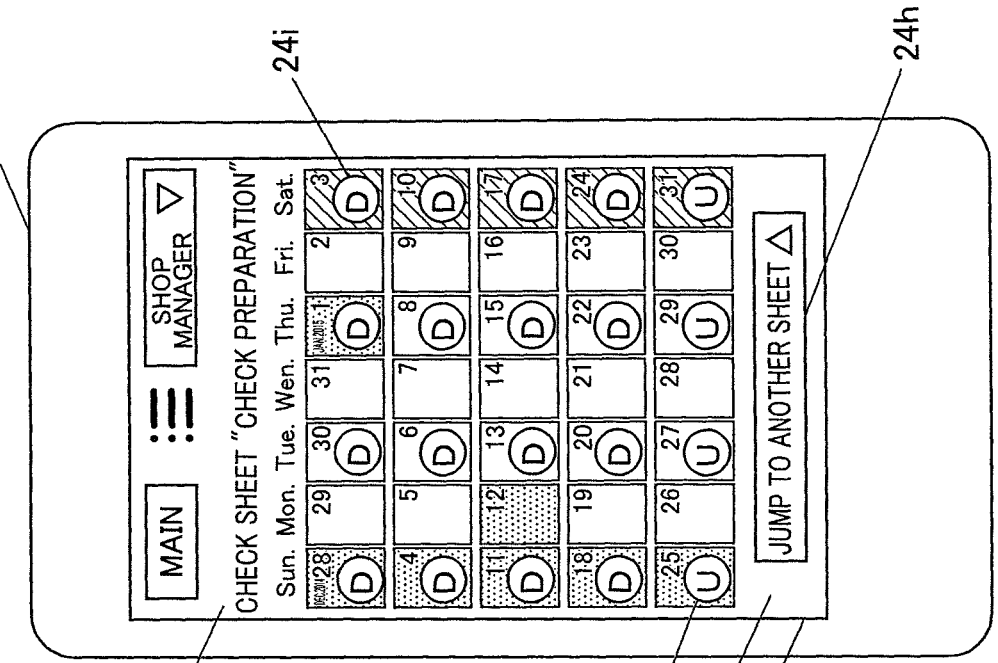
FIG. 15A and FIG. 15B illustrate another example of the display manner of a mark that is pasted on a check sheet.
Figure 15A:
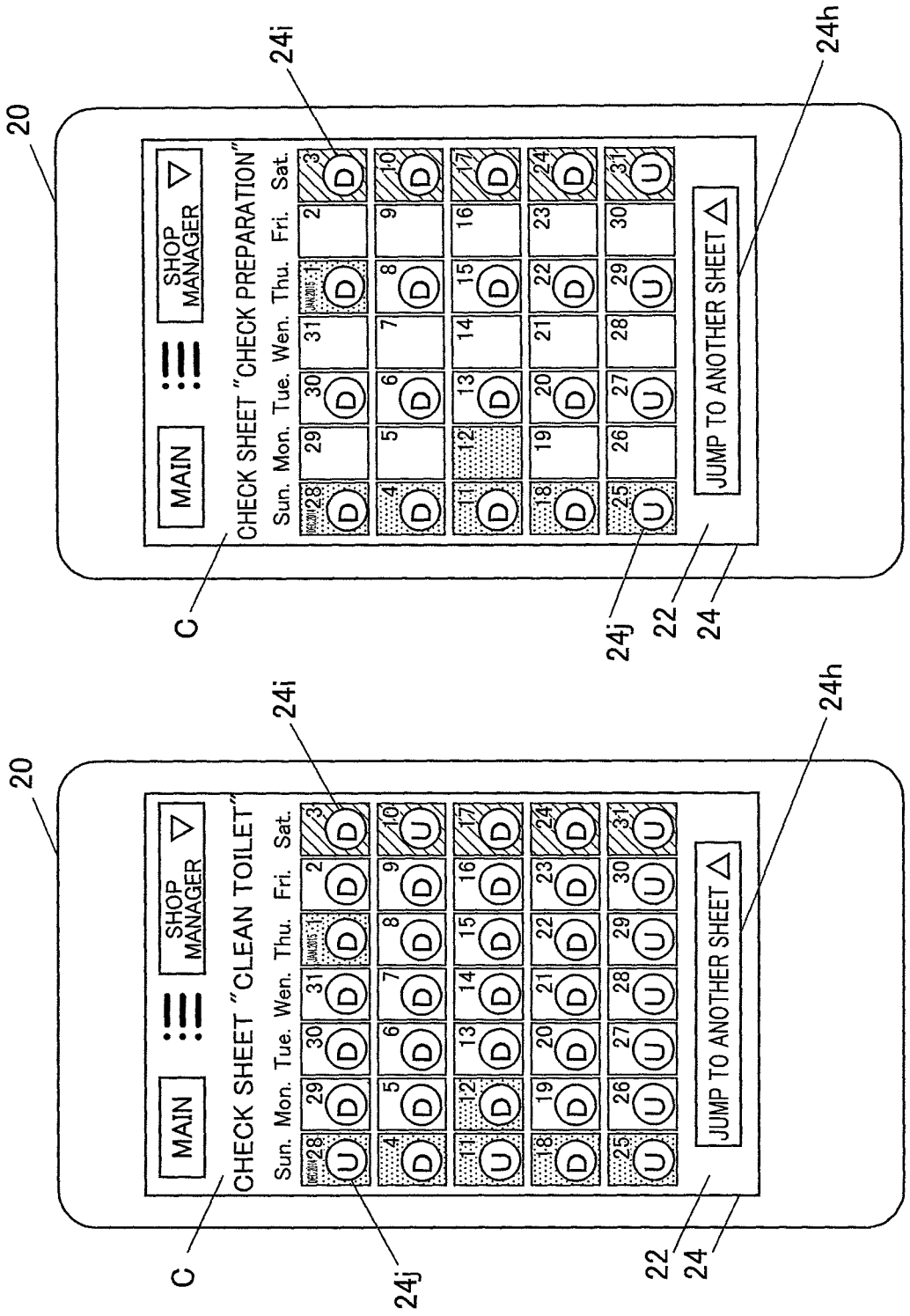

Another example of the updating manner of the check sheet C is such that when a task to be performed is completed, the check sheet C is updated so that the "undone" mark 24*j* of the corresponding date (e.g. Dec. 29 and 30, 2014, and the like) is replaced with the "done" mark 24*i* as illustrated in FIG. 15A and FIG. 15B. FIG. 15A illustrates an example of the check sheet C "clean toilet" in such configuration, and FIG. 15B illustrates an example of the check sheet C "check preparation".

Yet another example of the updating manner of the check sheet C is such that when a task to be performed is completed, the check sheet C is updated so that a red round spot mark (which indicates that a task to be performed has not been completed yet, illustrated as a meshed round spot in the figures) of the corresponding date (e.g. Dec. 29 and 30, 2014, and the like) is replaced with a blue round spot mark (which indicates that a task to be performed has been completed, illustrated as a solid round spot in the figures) as in FIG. 16A and FIG. 16B. FIG. 16A illustrates an example of the check sheet C "clean toilet" in such configuration, and FIG. 16B illustrates an example of the check sheet C "check preparation".

In the above-described embodiment, the check sheet C is a monthly calendar list that includes the date to perform a task. However, the check sheet C may be formed in any format with time slots in which date information or time information is linked to predetermined time periods.

It should be understood well that suitable changes can be made in the detailed configuration of the components and the detailed operation of the task management system 1 of the above-described embodiment without departing from the feature of the present invention.

While an embodiment of the present invention is described, the scope of the present invention is not limited to the above-described embodiment but encompasses the scope of the invention recited in the claims and the equivalents thereof.

The invention claimed is:

1. A task management apparatus, comprising:
    a hardware processor which is configured to:
    display, on a display, a check sheet screen;
    display, in the check sheet screen, a button that is operable to select a task from among a plurality of different tasks;
    display, in the check sheet screen, a check sheet for the task selected via the button, for checking whether the selected task on a certain date and time or in a certain time period has been completed with respect to each predetermined date and time or each predetermined time period, wherein the hardware processor displays a separate check sheet for each of the plurality of different tasks, such that when another one of the tasks is selected via operation of the button, the hardware processor switches the displayed check sheet to the check sheet for said selected another one of the tasks;
    display, in each separate check sheet, a plurality of mark pasting areas for pasting a predetermined mark with respect to each predetermined date and time or each predetermined period;
    retrieve a completion notification that indicates completion of the task corresponding to the displayed check sheet, wherein the completion notification includes date and time information or time information on a date and a time of the completion of the task of the completion notification; and
    when the hardware processor retrieves the completion notification, the hardware processor displays, as the predetermined mark, a first predetermined mark pasted on the mark pasting area of a date and time or a time period corresponding to the completion notification, thereby changing a display manner of said mark pasting area in the displayed check sheet for the task,
    wherein in a case in which a user performs a specifying operation to specify the displayed first predetermined mark pasted in the mark pasting area of the date and time or the time period corresponding to the completion notification, the hardware processor displays, in response to the specifying operation, detailed information regarding the completed task in a sub-window that is displayed so as to be superimposed over a part of the check sheet.

2. The task management apparatus according to claim 1, wherein the first predetermined mark comprises a text or a part of a text that means "done".

3. The task management apparatus according to claim 1, wherein:
    before the hardware processor retrieves the completion notification, the hardware processor is configured to display, as the predetermined mark, a second predetermined mark pasted on the mark pasting area of a date and time or a time period at which the task corresponding to the displayed check sheet is to be completed, and
    when the hardware processor retrieves the completion notification, the hardware processor deletes the second predetermined mark pasted on the mark pasting area of the date and time or the time period corresponding to the completion notification and displays the first predetermined mark on the mark pasting area in the displayed check sheet.

4. The task management apparatus according to claim 3, wherein the second predetermined mark which is displayed before retrieval of the completion notification comprises a text or a part of a text that means "undone".

5. The task management apparatus according to claim 1, wherein when the hardware processor retrieves the completion notification, the hardware processor changes the predetermined mark pasted on the mark pasting area of the date and time or the time period corresponding to the completion notification from a second predetermined mark to the first predetermined mark, the second predetermined mark being a different mark from the first predetermined mark.

6. The task management apparatus according to claim 1, wherein when the hardware processor retrieves the completion notification, the hardware processor changes a display color of the predetermined mark pasted on the mark pasting area of the date and time or the time period corresponding to the completion notification, the predetermined mark with the display color being changed corresponding to the first predetermined mark.

7. A task management method, comprising:
    displaying, on a display, a check sheet screen;
    displaying, in the check sheet screen, a button that is operable to select a task from among a plurality of different tasks;
    displaying, in the check sheet screen, a check sheet for the task selected via the button, for checking whether the selected task on a certain date and time or in a certain time period has been completed with respect to each predetermined date and time or each predetermined time period, wherein a separate check sheet is displayed for each of the plurality of different tasks, such that when another one of the tasks is selected via operation of the button, the displayed check sheet is switched to the check sheet for said selected another one of the tasks;

displaying, in each separate check sheet, a plurality of mark pasting areas for pasting a predetermined mark with respect to each predetermined date and time or each predetermined period;

retrieving a completion notification that indicates completion of the task corresponding to the displayed check sheet, wherein the completion notification includes date and time information or time information on a date and a time of the completion of the task of the completion notification; and when the completion notification is retrieved, displaying, as the predetermined mark, a first predetermined mark pasted on the mark pasting area of a date and time or a time period corresponding to the completion notification, thereby changing a display manner of said mark pasting area in the displayed check sheet for the task; and in a case in which a user performs a specifying operation to specify the displayed first predetermined mark pasted in the mark pasting area of the date and time or the time period corresponding to the completion notification, displaying, in response to the specifying operation, detailed information regarding the completed task in a sub-window that is displayed so as to be superimposed over a part of the check sheet.

8. The task management method according to claim 7, wherein the first predetermined mark comprises a text or a part of a text that means "done".

9. The task management method according to claim 7, wherein:
before the completion notification is retrieved a second predetermined mark is displayed as the predetermined mark so as to be pasted on the mark pasting area of a date and time or a time period at which the task corresponding to the displayed check sheet is to be completed, and
when the completion notification is retrieved, the second predetermined mark pasted on the mark pasting area of the date and time or the time period corresponding to the completion notification is deleted and the first predetermined mark is displayed on the mark pasting area in the displayed check sheet.

10. The task management method according to claim 9, wherein the second predetermined mark which is displayed before retrieval of the completion notification comprises a text or a part of a text that means "undone".

11. The task management method according to claim 7, wherein, when the completion notification is retrieved, the predetermined mark pasted on the mark pasting area of the date and time or the time period corresponding to the completion notification is changed from a second predetermined mark to the first predetermined mark, the second predetermined mark being a different mark from the first predetermined mark.

12. The task management method according to claim 7, wherein when the completion notification is retrieved, a display color of the predetermined mark pasted on the mark pasting area of the date and time or the time period corresponding to the completion notification is changed, the predetermined mark with the display color being changed corresponding to the first predetermined mark.

13. A non-transitory computer-readable medium storing a program for making a computer of a task management apparatus perform processing comprising:
displaying, on a display, a check sheet screen;

displaying, in the check sheet screen, a button that is operable to select a task from among a plurality of different tasks;

displaying, in the check sheet screen, a check sheet for the task selected via the button, for checking whether the selected task on a certain date and time or in a certain time period has been completed with respect to each predetermined date and time or each predetermined time period, wherein a separate check sheet is displayed for each of the plurality of different tasks, such that when another one of the tasks is selected via operation of the button, the displayed check sheet is switched to the check sheet for said selected another one of the tasks;

displaying, in each separate check sheet, a plurality of mark pasting areas for pasting a predetermined mark with respect to each predetermined date and time or each predetermined period;

retrieving a completion notification that indicates completion of the task corresponding to the displayed check sheet, wherein the completion notification includes date and time information or time information on a date and a time of the completion of the task of the completion notification;

when the completion notification is retrieved, displaying, as the predetermined mark, a first predetermined mark pasted on the mark pasting area of a date and time or a time period corresponding to the completion notification, thereby changing a display manner of said mark pasting area in the displayed check sheet for the task, and in a case in which a user performs a specifying operation to specify the displayed first predetermined mark pasted in the mark pasting area of the date and time or the time period corresponding to the completion notification, displaying, in response to the specifying operation, detailed information regarding the completed task in a sub-window that is displayed so as to be superimposed over a part of the check sheet.

14. The non-transitory computer-readable medium according to claim 13, wherein the first predetermined mark comprises a text or a part of a text that means "done".

15. The non-transitory computer-readable medium according to claim 13, wherein:
before the completion notification is retrieved a second predetermined mark is displayed as the predetermined mark so as to be pasted on the mark pasting area of a date and time or a time period at which the task corresponding to the displayed check sheet is to be completed, and
when the completion notification is retrieved, the second predetermined mark pasted on the mark pasting area of the date and time or the time period corresponding to the completion notification is deleted and the first predetermined mark is displayed on the mark pasting area in the displayed check sheet.

16. The non-transitory computer-readable medium according to claim 13, wherein when the completion notification is retrieved, the predetermined mark pasted on the mark pasting area of the date and time or the time period corresponding to the completion notification is changed from a second predetermined mark to the first predetermined mark, the second predetermined mark being a different mark from the first predetermined mark.

17. The non-transitory computer-readable medium according to claim 13, wherein in the display control processing, when the completion notification is retrieved, a display color of the predetermined mark pasted on the mark pasting area of the date and time or the time period corresponding to the completion notification is changed, the predetermined mark with the display color being changed corresponding to the first predetermined mark.

* * * * *